UNITED STATES PATENT OFFICE.

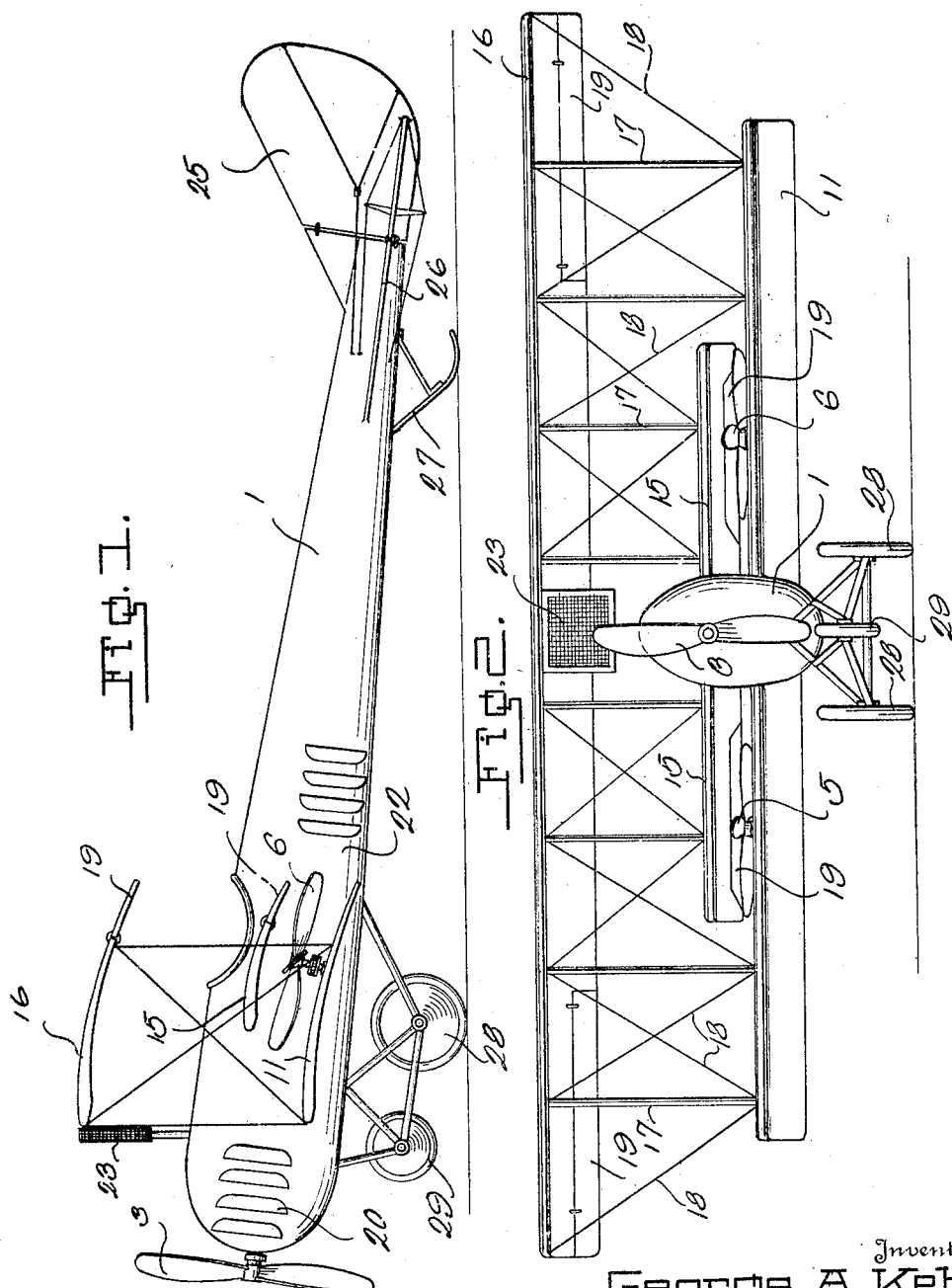

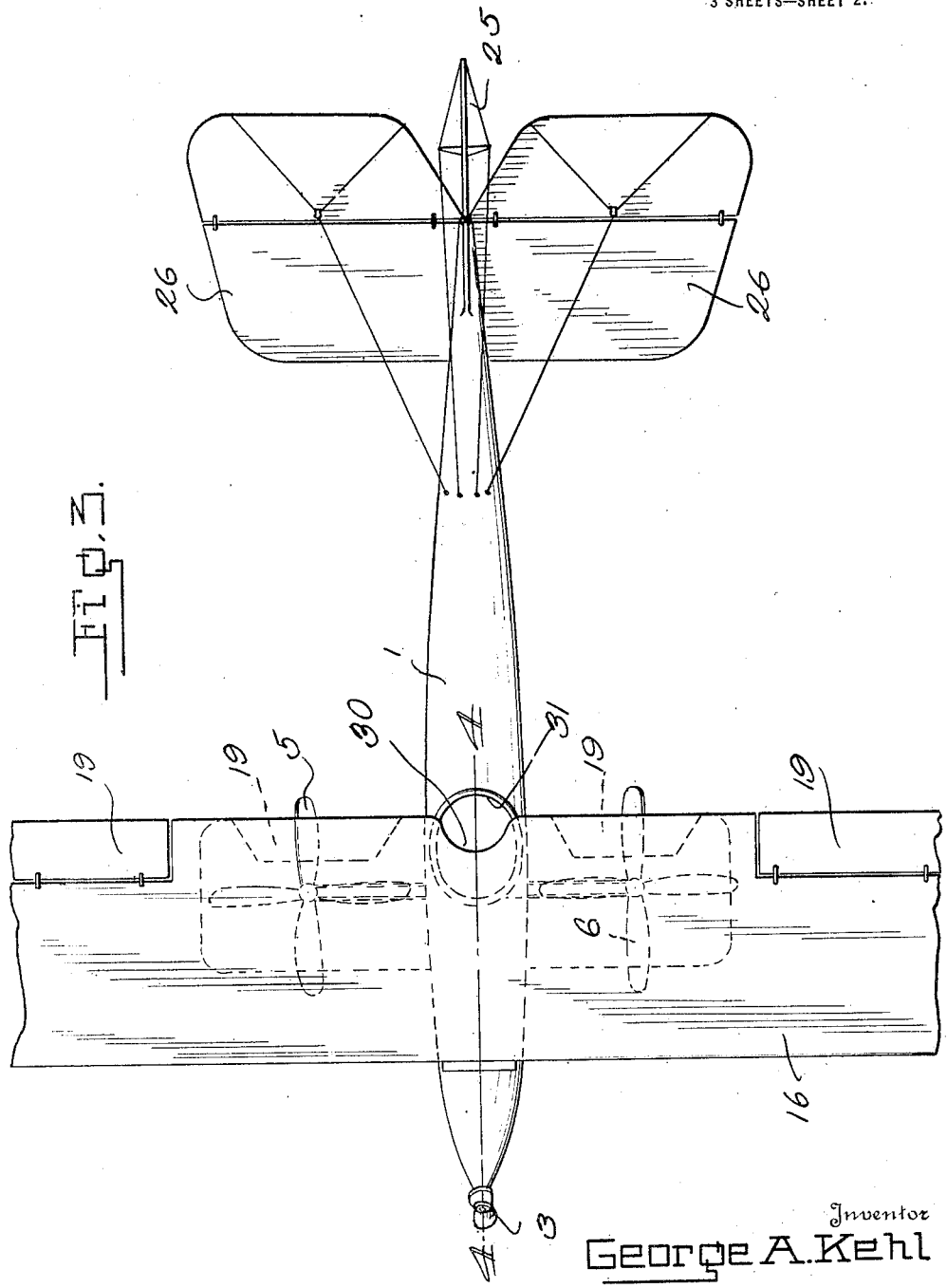

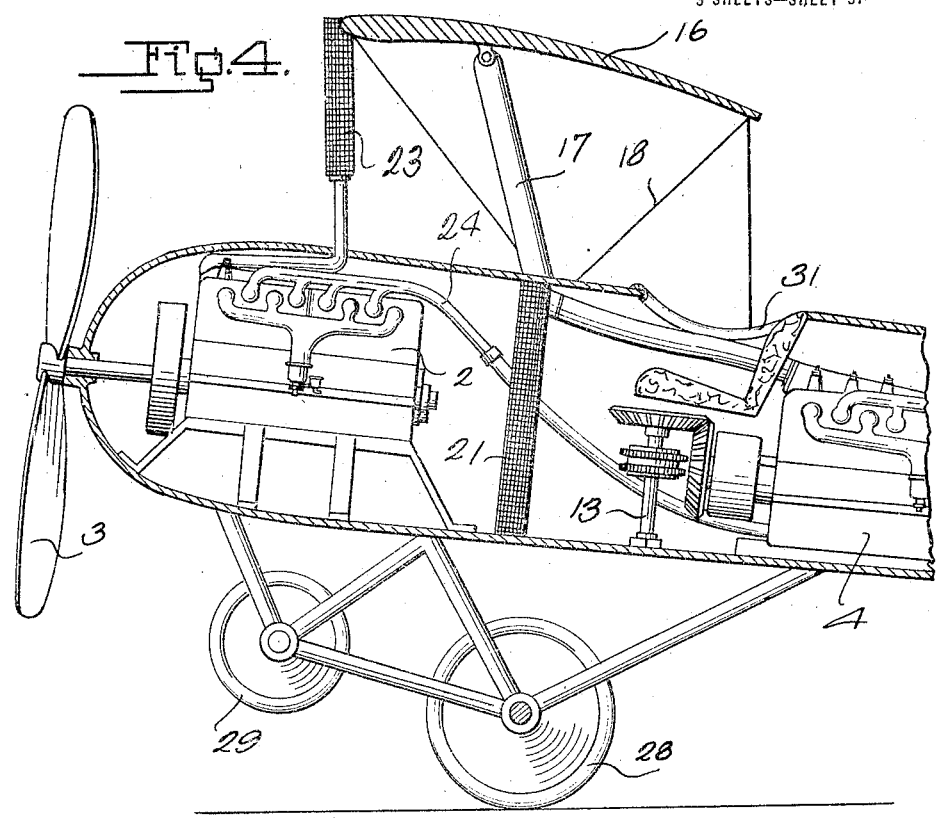

GEORGE A. KEHL, OF ST. PAUL, MINNESOTA.

AIRPLANE.

1,380,391. Specification of Letters Patent. Patented June 7, 1921.

Application filed July 25, 1918. Serial No. 246,715.

*To all whom it may concern:*

Be it known that I, GEORGE A. KEHL, a citizen of the United States, and resident of St. Paul, in the county of Ramsey and State of Minnesota, have invented certain new and useful Improvements in Airplanes, of which the following is a specification.

This invention relates to airplanes, and more particularly to a tractor tri-plane of the military type, an object of the invention being to provide a fuselage of pisciform shape which will decrease inertia or inherent resistance to the displacement of the body or fuselage and prevent eddying or discontinuity, thus preserving stream line flow of the air and keep resistance to the progress of the airplane at a minimum which particular form of fuselage will also decrease head resistance.

Another object of the invention is to provide a tri-plane, in which the intermediate plane or aerofoil the span and width of which is much less than the corresponding dimensions of both the uppermost and lowermost planes or aerofoils, the width of which is substantially equal while the span of the uppermost aerofoil is greater than the span of the lowermost and to employ in connection with the particular construction and arrangement of the aerofoils a pair of propellers revolving about vertical axes, the direction of thrust being opposed to gravity, to increase the lifting action of the airplane, the said intermediate relatively small aerofoil being positioned to receive a majority of the lifting power from the said horizontal propellers.

A further object of the invention is to mount ailerons upon both the uppermost and intermediate planes or aerofoils to permit of more perfect control of the airplane.

Another object of the invention is to provide a particular form of landing gear for the airplane which comprises a pair of tractor wheels positioned in the usual place, beneath the fuselage and a third wheel positioned forwardly of and intermediate the ordinary wheels, and also having its axis above the axis of the ordinary wheels, the said forward wheels being provided to prevent the nose of the fuselage from striking the ground when landing.

A still further object of the invention is to provide the fuselage with a plurality of air inlet or receiving openings near the nose end thereof into which the air is directed by suitable outstruck flanges, for passing through the radiator of the motor or engine which controls the operation of the horizontal propellers and to provide the fuselage with a plurality of openings rearwardly of the rear engine and also the pilot's seat, to allow the air entering the fuselage through the forward opening to exhaust therethrough and also to direct the exhaust from the front motor which operates the tractor propeller rearwardly for passage outwardly through the last named opening.

Other objects of the invention will appear in the following detailed description, taken in connection with the accompanying drawings, forming a part of this specification, and in which drawings:

Figure 1 is a side elevation of the airplane.

Fig. 2 is a front elevation of the airplane.

Fig. 3 is a top plan of the airplane having the tips of the aerofoils or planes broken away.

Fig. 4 is a fragmentary longitudinal section through the forward end of the airplane.

Fig. 5 is a fragmentary transverse vertical section illustrating the manner of driving the horizontal propellers which rotate about vertical axes.

Referring more particularly to the drawings, 1 indicates the fuselage of the airplane which is of pisciform shape to preserve the stream-line flow of air about the same and materially reduce resistance to the progress of the airplane, as well as to reduce the eddying or discontinuity to a minimum. The sides of the fuselage 1 bow upwardly and converge at the nose and tail ends thereof, providing a thin sharp nose for cutting through the air currents. The fuselage 1 carries an engine or motor 2 therein at its nose end which engine drives the tractor propeller 3. The tractor propeller 3 is positioned, as usual, forwardly of the nose of the fuselage 1.

A second motor or engine 4 is positioned within the fuselage rearwardly of the engine 2 and operates a pair of propellers 5 and 6. The propellers 5 and 6 rotate about vertical axes, and their direction of thrust is opposed to gravity to impart a lifting action to the airplane. The propellers 5 and 6 are rotatably mounted upon vertical shafts 8 supported by suitable bearings 9 and having their lower ends engaging in thrust bearings 10 carried by the lowermost plane or aerofoil 11 of the airplane structure. The shafts 8 are connected, by any suitable type of power transmitting mechanism, preferably "silent" chains 12 with a shaft 13 that is positioned within the fuselage and is operatively connected in any suitable manner to the engine 4. These horizontal propellers 5 and 6, being positioned one upon each side of the fuselage, and rotated in opposite directions, will continually hold the airplane in a substantially perfect state of lateral stability and eliminates the need of the employment of the usual horizontal and vertical stabilizers commonly employed at the tail end of the fuselage.

The airplane is provided with three aerofoils or planes, namely the lowermost aerofoil 11, and intermediate aerofoil 15 and the uppermost aerofoil 16. The angles of incidence and the cambers thereof may be regulated as necessary. The intermediate aerofoil 15 which receives the major portion of the lifting power of the horizontal propellers 6 is smaller in both span and width than the lowermost aerofoil 11 while the span of the latter is less than the span of the uppermost aerofoil 16 as clearly shown in Figs. 1 and 2 of the drawings. These aerofoils are supported and braced by the usual type of struts and guy wires as indicated at 17 and 18 respectively.

The intermediate areofoil 15 and the uppermost areofoil 16 each have sets of ailerons 19 which are operated in the usual manner. By providing each of these aerofoils with ailerons, a more positive control of the triplane is permitted.

The fuselage 1 is provided with a plurality of flanged air inlet openings indicated at 20, at its nose, and these openings permit the inlet of air into the fuselage for passage through the radiator 21 of the cooling system of the rear engine 4 and after the air passes through the radiator 21 it exhausts through suitable flanged openings 22, the flanges of which are disposed in the opposite direction to the flanges of the flanged opening 20 in order to guide the egressing air toward the tail of the fuselage. The radiator 23 of the cooling system of the forward engine 2 is attached to the uppermost areofoil 16, intermediate its ends, so that the water or cooling fluid of the engine will be cooled, while in the radiator, by the air currents passing through the radiator 23. The exhaust pipe, 24 of the forward engine 2, is extended, through the fuselage 1 and leads rearwardly to guide the exhausting gases from the forward engine 2 to the flanged openings 22 for outlet therethrough.

It will be noted, that both the forward and rear engines; and all of their companion mechanisms are positioned entirely within the fuselage 1, so as to prevent any obstruction to the air currents traveling along the stream-line configuration of the fuselage.

The fuselage 1 has the usual rudder 25 carried thereby and also has tail planes or empennage 26 carried thereby.

The landing gear, which is carried by the under surface of the fuselage 1 includes the tail skid 27 and the front under-carried structure including the usual wheels 28 and a forward centrally disposed wheel 29. The wheel 29 is smaller in diameter than the wheels 28, being identical in construction with the wheels 28 in all other respects, and its axis is positioned nearer the under surface of the fuselage than the axis of the wheels 28. This forward upper wheel 29 is provided for. preventing the nose of the body or fuselage from striking the ground should the machine go out of control and perform what is known as a "nose drive" when landing.

The top or uppermost aerofoil 16 may be provided with a cut-out portion indicated at 30 to permit entrance of the pilot or aviator into the cock-pit indicated at 31.

The propellers 5 and 6, will materially increase the lifting action of the airplane, and maintain the lateral stability of the same and also overcome any tendency toward propeller torque, and they, in connection with the angle of incidence of the aerofoils will enable the airplane to mount more quickly than could a machine which was not so equipped; they further would maintain the machine in the air, against falling in case the forward motor or engine and tractor propeller should become incapacitated. The propellers 5 and 6 are maintained in horizontal positions by bracing or supporting bars 32 which extend outwardly from the fuselage 1.

Changes in details may be made without departing from the spirit of this invention, but:

I claim:

1. In an airplane the combination of a fuselage; a tractor propeller carried by said fuselage; a plurality of main aerofoils associated with said fuselage; an auxiliary aerofoil of less total surface area than said main aerofoils, carried by said fuselage intermediate said main aerofoils; a helicopter propeller associated with said auxiliary aerofoil and adapted to exert a vertical thrust thereon; and independent motors adapted to rotate each of said propellers.

2. In an airplane the combination of a fuselage provided with air inlet and outlet openings; a tractor propeller carried by said fuselage; a plurality of main aerofoils rigid with said fuselage; an auxiliary aerofoil of less total surface area than either of said main aerofoils, carried by said fuselage intermediate said main aerofoils; a helicopter propeller associated with said auxiliary aerofoil and adapted to exert a vertical thrust thereon; a plurality of motors mounted within said fuselage and adapted to rotate said propellers; and a cooling radiator mounted within said fuselage between said motors, adapted to be cooled by air passing through said inlet and outlet openings.

3. In an airplane the combination of a fuselage; a tractor propeller carried by said fuselage; a plurality of main aerofoils rigid with said fuselage; an auxiliary aerofoil of less total surface area than said main aerofoils, carried by said fuselage intermediate said main aerofoils; a plurality of helicopter propellers mounted at substantially right angles to said auxiliary aerofoil and adapted to exert a vertical thrust thereon; means adapted to vary the effective surface of said auxiliary aerofoil whereby the amount of said thrust may be controlled; a motor adapted to rotate said tractor propeller; and a second motor adapted to rotate said helicopter propellers.

GEORGE A. KEHL.